(12) United States Patent
Hahn et al.

(10) Patent No.: US 7,952,314 B2
(45) Date of Patent: May 31, 2011

(54) ELECTRONIC CONTROL DEVICE OF AN ELECTRICAL DRIVE SYSTEM WITH REDUNDANT DISCONNECTION DEVICE

(75) Inventors: Ulrich Hahn, Neustadt/A. (DE);
Richard Krüger, Wolfratshausen (DE);
Rolf-Dieter Pavlik, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 320 days.

(21) Appl. No.: 12/227,479

(22) PCT Filed: Apr. 12, 2007

(86) PCT No.: PCT/EP2007/053580
§ 371 (c)(1),
(2), (4) Date: Nov. 17, 2008

(87) PCT Pub. No.: WO2007/134915
PCT Pub. Date: Nov. 29, 2007

(65) Prior Publication Data
US 2009/0091285 A1    Apr. 9, 2009

(30) Foreign Application Priority Data

May 24, 2006    (DE) .................. 10 2006 024 378

(51) Int. Cl.
*G05B 23/02* (2006.01)

(52) U.S. Cl. .................. 318/565; 318/452; 318/490
(58) Field of Classification Search .................. 318/565, 318/452, 490, 282, 466; 701/49; 361/23
See application file for complete search history.

(56) References Cited

U.S. PATENT DOCUMENTS

| 5,339,014 A | 8/1994 | Nesper | |
| 2010/0001676 A1* | 1/2010 | Kram et al. | 318/452 |

FOREIGN PATENT DOCUMENTS

| DE | 44 32 759 A1 | 3/1996 |
| DE | 103 21 465 | 12/2004 |
| DE | 10163010 B4 | 1/2007 |
| EP | 0 465 710 A1 | 1/1992 |
| EP | 0 658 832 A2 | 6/1995 |

* cited by examiner

*Primary Examiner* — Karen Masih (57) ABSTRACT

In normal mode, a central unit of an electronic control device receives desired and actual values for determining desired current values which are transmitted to an electronic drive unit. The central unit of the electronic drive unit receives the desired current values for determining drive signals for circuit breakers. In monitoring mode, the central unit of the electronic control device checks whether an connected electric motor is in a safe state. If not, the control device transmits disconnection signals to a disconnection device and to the drive unit. The central unit of the electronic control device generates checking information for the drive unit. In the monitoring mode, the central unit of the drive unit checks whether a disconnection signal is transmitted to the central unit and whether the checking information is correct.

20 Claims, 4 Drawing Sheets

FIG 1

ELECTRONIC CONTROL DEVICE OF AN ELECTRICAL DRIVE SYSTEM WITH REDUNDANT DISCONNECTION DEVICE

CROSS REFERENCE TO RELATED APPLICATIONS

This application is the US National Stage of International Application No. PCT/EP2007/053580 filed Apr. 12, 2007 and claims the benefit thereof. The International Application claims the benefits of German application No. 10 2006 024 378.1 DE filed May 24, 2006. Both of the applications are incorporated by reference herein in their entirety.

FIELD OF INVENTION

The present invention relates to an electronic control device of an electrical drive system, with a central processing unit, the central processing unit being designed such that
during normal operation it receives a sequence of setpoint position, speed or torque values from a control device that is of a higher order than said electronic control device, determines setpoint current values on the basis of the received setpoint values and corresponding actual values and transmits the setpoint current values to a central processing unit of a drive unit that is of a lower order than the electronic control device.

The present invention also relates to an electronic drive unit of an electrical drive system, with a central processing unit, the central processing unit being designed such that
during normal operation it receives a sequence of setpoint current values from an electronic control device that is of a higher order than said drive unit, determines, on the basis of the setpoint current values, control signals for a number of circuit breakers by means of which an electric motor is to be connected to a power supply according to the setpoint current value, and outputs the control signals to the circuit breakers.

The present invention lastly relates to an electrical drive system comprising an electronic control device of the type described above and at least one electronic drive unit of a lower order than the electronic control device of the type described above, there being a data link between said electronic control device and said electronic drive unit.

BACKGROUND OF INVENTION

An electrical drive system has an electronic control device, a number of electric motors (at least one) and an electronic control unit for each electric motor. The electronic control device is clocked with a sequence of setpoint values by a higher-order control device (e.g. a programmable logic controller or a numerical control). The setpoint values are generally setpoint position, speed or torque values.

The setpoint values are received within the electronic control device by a central processing unit of the electronic control device. On the basis of the setpoint values, the central processing unit of the electronic control device determines setpoint current values and transmits the setpoint current values to a central processing unit of the drive unit via an output interface of the electronic control device and an input interface of the electronic drive unit.

In the drive unit, its central processing unit receives the setpoint current values and determines, on the basis of the setpoint current values, control signals for a number of circuit breakers (at least one) and outputs the control signals to the circuit breakers. The circuit breakers are generally integral parts of the drive unit. In this case the circuit breakers are controlled directly by the central processing unit. It is conceivable for the circuit breakers not to be integral parts of the drive unit, in which case the central processing unit outputs the control signals to the circuit breakers via an output interface.

Although monitoring of the electric motor by the electronic control device of the drive system is possible in principle, the procedure described above only guarantees de-energization of the electric motor if all the relevant components (control device, drive unit, circuit breakers) are operating properly. If, on the other hand, one of said components fails, de-energization of the electric motor is no longer guaranteed.

In order to be able to ensure safe de-energization, safety regulations (IEC 61508, for example) require that each individual fault is reliably detected and the power supply of the electric motor is safely disconnected upon detection of an individual fault. For this purpose two mutually independent disconnection devices are required which are controlled by two mutually independent units.

Reliable detection of individual faults can be ensured, for example, by all the signal paths and all the signal processing components being of redundant (i.e. at least two-channel) design. Drive systems of this kind are generally known. With these drive systems, monitoring is realized by central processing units which are embodied as relatively powerful processors.

It is possible for the central processing unit of the electronic control device to be one of the central processing units which implement monitoring.

It is also already known that consecutive components viewed in the signal flow direction can monitor one another. For example, a higher-order and a lower-order controller can monitor one another. In this case, central processing units implemented as relatively powerful processors are required in the higher-order controller and in the lower-order controller for mutual monitoring.

The central processing unit of the electronic drive unit is relatively low-power. During normal operation it only needs to be able to determine and output the control signals for the circuit breakers on the basis of the setpoint current values. The central processing unit of the electronic drive unit is generally unable to undertake the necessary monitoring of its superordinate electronic control device.

Although it is of course conceivable to provide the electronic drive unit with a sufficiently powerful central processing unit, this would increase the costs of the electronic drive unit. This path is not therefore taken in the prior art.

In the field of programmable logic controllers, reliable program processing with a single processor is already known. This method generally employs what is termed coded programming. Coded programming as such is well known.

With coded programming, a user program is created in plain text in the usual way. On the basis of the user program, a translation program generates a control program which has a payload part and a supplementary part. The payload part has the functionality assigned thereto by the user program. The supplementary part is designed such that it contains the same input variables as the payload part, but its outputs (or at least one of the outputs) being the nth multiple of the corresponding output of the payload part, where n is a suitably determined prime number.

The output signal of the supplementary part corresponds to checking information which, in itself or in conjunction with at least one other signal transmitted to the at least one drive unit in monitoring mode, is indicative of whether the programmable logic controller is operating properly, because the output signal generated by means of the supplementary part can only assume quite specific values. If these values are not assumed, this indicates a programmable logic controller malfunction.

In the prior art, the programmable logic controller transmits the checking information to another module. This other module checks whether it is receiving the checking information and whether the checking information is correct. If it does not receive the checking information or the checking information is incorrect, a fault response is initiated; in particular an installation controlled by the programmable logic controller is placed in a safe state.

DE 103 21 465 A1 discloses an electronic control device of an electrical drive system, which device has a central processing unit. The central processing unit is designed such that in normal mode it receives a sequence of setpoint position or speed values from a control device of a higher order than the electronic control device, determines setpoint current values on the basis of the received setpoint values and corresponding actual values and transmits the setpoint current values to a drive unit subordinate to the electronic control device. The electronic control device additionally monitors itself, the higher-order control device and a position sensor for correct operation. In the event of a malfunction being detected, the electronic control device transmits a disconnection signal to the electronic drive unit so that the electronic drive unit interrupts an electrical power supply of the electric motor. The electronic control device finally generates checking information which in itself or in conjunction with other information transmitted to the higher-order control device is indicative as to whether the electronic control device is operating properly. It transmits the checking information to the higher-order control device.

DE 103 21 465 A1 also discloses the corresponding electronic drive unit and its operation. The electronic drive unit receives the sequence of setpoint current values and determines, on the basis of the setpoint current values, control signals for a number of circuit breakers by means of which the electric motor is to be connected to the power supply according to the setpoint current values. The electronic drive unit outputs the control signals to the circuit breakers. The electronic drive unit also checks whether a disconnection signal is being transmitted thereto by the electronic control device or the higher-order control device. In the event of a disconnection signal being transmitted, the electronic drive unit interrupts the power supply of the electric motor.

EP 0 658 832 A2 discloses an electrical drive system comprising a higher-order electronic control device, a lower-order electronic drive unit and an electric motor. Present inside the higher-order electronic control device is a setpoint value generator which determines a sequence of setpoint position values and prescribes them as the setpoint values for a position controller within the electronic control device. The position controller determines setpoint speed values on the basis of the setpoint position values and corresponding actual position values and transmits the setpoint speed values to the drive unit. The electronic control device checks whether the electric motor is being moved within a permissible travel range. If it leaves the permissible travel range, the electronic control device triggers a first disconnection device so that electric motor is disconnected from its power supply. The same response is initiated if a position determined by the electronic control device and a position determined by the electronic drive unit deviate significantly from one another or the electronic control device detects a malfunction in itself or a drive unit malfunction.

In the case of EP 0 658 832 A2, the drive unit executes the corresponding functions. In particular, it receives the setpoint speed values from the electronic control device, also receives actual speed values and determines setpoint current values which it specifies for a current controller disposed inside the drive unit. On the basis of the setpoint current values, the current controller determines control signals for a number of circuit breakers by means of which an electric motor is to be connected to a power supply according to the setpoint current values. The control signals are specified for the circuit breakers. In addition, the electronic drive unit—viewed in mirror image—initiates the same checks and check responses as the electronic control device.

SUMMARY OF INVENTION

An object of the present invention is to create an electronic control device of an electrical drive system, an electronic drive unit of an electrical drive system and a corresponding drive system which provide a simple and inexpensive means of safely disconnecting the power supply of an electric motor in the event of a fault.

The object is achieved by an electronic control device, an electronic drive unit and an electrical drive system according to the independent claims.

The central processing unit of the electronic control device is inventively designed such that it checks during monitoring mode whether an electric motor controlled by the electronic drive unit is in a safe state. In the event that the electric motor is not in the safe state, the central processing unit of the electronic control device outputs a first disconnection signal to a first disconnection device and transmits a second disconnection signal to a central processing unit of the electronic drive unit. A power supply of the electric motor can be disconnected by means of both the first disconnection device and the electronic drive unit. The central processing unit of the electronic control device also generates, at least in monitoring mode, checking information which, in itself or in conjunction with at least one other signal transmitted to the central processing unit of the electronic drive unit during monitoring mode, is indicative of whether the electronic control device is operating properly, and transmits the checking information to the central processing unit of the electronic drive unit.

The central processing unit of the electronic drive unit is designed such that it checks, in monitoring mode, whether a disconnection signal is being transmitted thereto by the electronic control device. In the event of a disconnection signal being transmitted, it disconnects a power supply of the electric motor via a second disconnection device. The central processing unit of the electronic drive unit also checks in monitoring mode whether the checking information is being transmitted thereto by the electronic control device and whether the checking information is correct. In the event that the checking information is not being transmitted or is incorrect, it likewise interrupts the power supply of the electric motor via the second disconnection device.

Because of the design of the electronic control device, the drive unit does not require a powerful central processing unit, as the central processing unit of the drive unit only needs to be able to check the checking information. On the other hand—in contrast to the prior art—a second, powerful processor which performs the monitoring functions in parallel with the electronic control device's central processing unit is not required.

It is possible for the central processing unit of the electronic control device to perform monitoring continuously, in parallel with normal operation. It is also possible for the central processing unit of the electronic control device to determine automatically whether it performs normal operation or monitoring. The central processing unit of the electronic control device preferably receives an operating mode command from the higher-order control device and decides on the basis of the operating mode command whether it assumes normal or monitoring mode.

The safe state for the maintenance of which the electric motor is monitored in monitoring mode is in principle selectable as required. Typical safe states are standstill of the electric motor, rotation of the electric motor at a low speed below a limit speed, or observance of a maximum limit torque. It is possible for the safe state of the electronic control device of the drive system to be externally specified. The safe state is preferably determined by settings stored in the electronic control device of the electrical drive system.

It is possible for the central processing unit of the electronic control device to receive a setpoint parameter. On the basis of the setpoint parameter, the central processing unit of the electronic control device can if necessary decide whether the setpoint values received by it are position, speed or torque values. This procedure allows more flexible operation of the electronic control device of the drive system.

It is possible for the second disconnection signal transmitted to the central processing unit of the electronic drive unit to be contained in the checking information. Alternatively, the disconnection signal transmitted to the central processing unit of the electronic drive unit can be a second signal different from that of the checking information.

For the determination of the checking information by the central processing unit of the electronic control device, various options are possible. It is preferable that the central processing unit of the electronic control device determines the checking information on the basis of the setpoint values by means of coded programming.

The central processing unit of the electronic drive unit continuously checks the checking information in such a way that it can detect whether the checking information is correct. If the checking information has been determined by coded programming, the central processing unit of the electronic drive unit checks the checking information to ascertain whether it corresponds to a predefined number in coded programming terms and/or to at least one signal transmitted to the electronic drive unit during monitoring mode.

It is possible for the central processing unit of the electronic control device to generate the checking information even during normal mode and transmit it to the electronic drive unit. For example, the central processing unit of the electronic control device can continuously check whether the electric motor is in a safe state, determine the checking information and transmit the checking information. It is only transmission of the disconnection signals to the first disconnection device and the drive unit that does not occur. The difference between normal mode and monitoring mode in this case is that during normal mode outputting of the disconnection signals is deactivated, whereas in monitoring mode it is activated.

Accordingly it is possible for normal mode and monitoring mode to be identical on the part of the electronic drive unit. Alternatively, however, it would also be possible to make monitoring mode activatable or deactivatable.

It is possible for the central processing unit of the electronic control device to control the first disconnection device directly. The central processing unit of the electronic control device preferably controls the first disconnection device via the electronic drive unit. In this case the electronic drive unit also receives the disconnection signal intended for the first disconnection device and forwards it to the first disconnection device. Said forwarding preferably bypasses the central processing unit of the electronic drive unit.

The central processing unit of the electronic control device is generally implemented as a processor which executes a control program. The electronic control device therefore preferably has a storage device in which the control program is stored. The central processing unit of the electronic control device in this case performs its functions by executing the control program. The control program is preferably implemented as a system program that cannot be modified by the user.

The central processing unit of the electronic drive unit is preferably incorporated in an ASIC. Its circuitry is designed such that it operates without executing a control program. It is alternatively possible for the electronic drive unit to have a storage device in which a control program is stored, and for the central processing unit of the electronic drive unit to perform its functions by executing the control program.

The control program for the central processing unit of the electronic drive unit—thus present—is also preferably implemented as a system program that cannot be modified by the user.

The storage device can if necessary be incorporated in the ASIC.

BRIEF DESCRIPTION OF THE DRAWINGS

Further advantages and details will emerge from the following description of exemplary embodiments in conjunction with the accompanying schematic drawings in which.

DETAILED DESCRIPTION OF INVENTION

Figure 1:
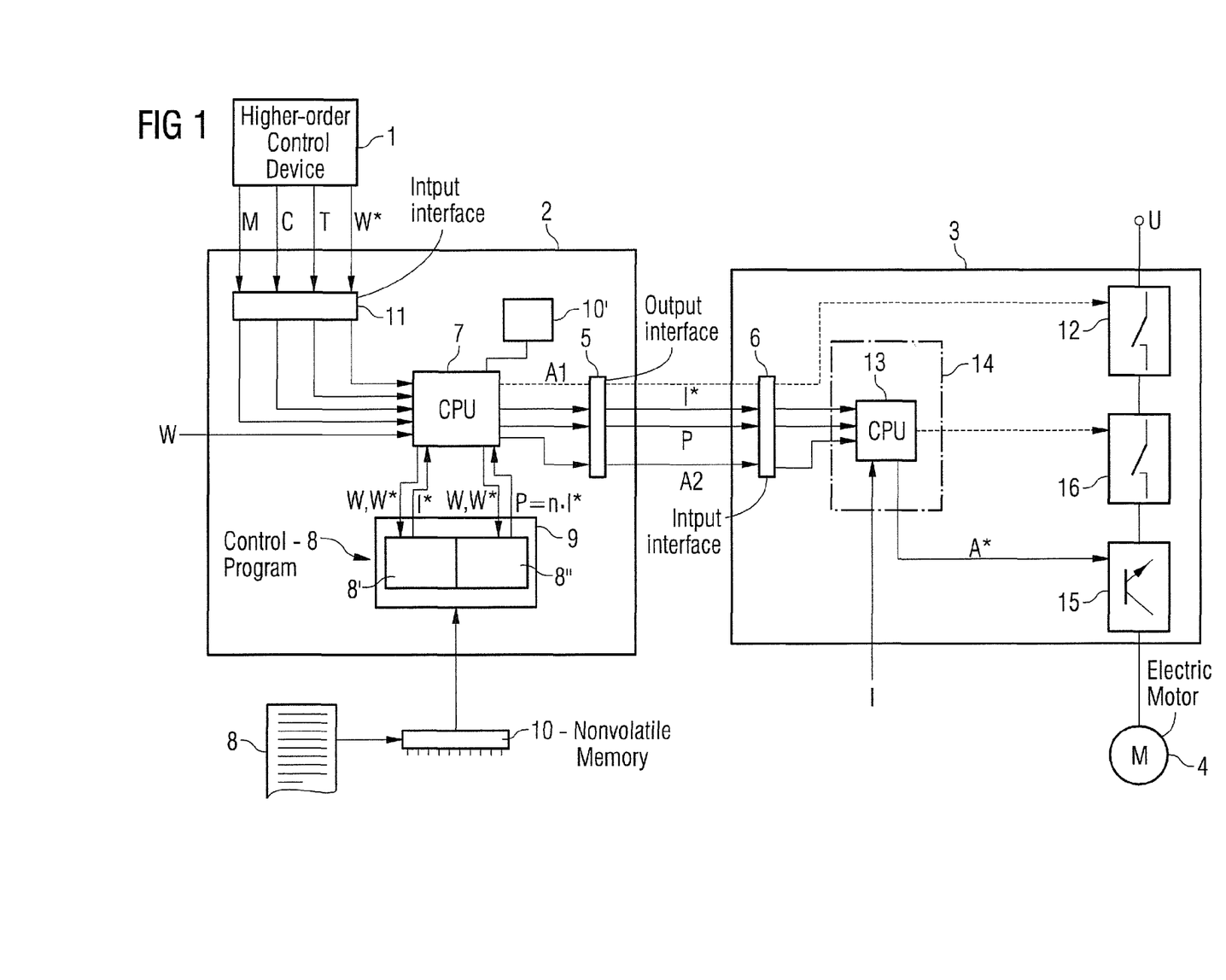
FIG. 1 shows a block diagram of an electrical drive system.

As illustrated in FIG. 1, an electrical drive system has a higher-order control device 1, an electronic control device 2, at least one electronic drive unit 3 and at least one electric motor 4. The higher-order control device 1 can be, for example, a programmable logic controller or a numerical control. The number of electric motors 4 corresponds to the number of drive units 3.

The electronic control device 2 has an output interface 5. The drive unit 3 has an input interface 6. The output interface 5 of the electronic control device 2 and the input interface 6 of the drive unit 3 are interconnected via a data link.

If more than one drive unit 3 is present, these can be connected to the electronic control device 2 in different ways. For example, connection via a bus system is conceivable. It is also conceivable for the electronic control device 2 to have a number of output interfaces 5 and each output interface 5 to be connected to a single drive unit 3.

The electronic control device 2 has a central processing unit 7. The central processing unit 7 is generally implemented as a microprocessor 7. If it is implemented as a microprocessor 7, during operation it executes a control program 8 which is stored in a storage device 9 of the electronic control device 2. The central processing unit 7 performs in this case its functions, which will be described in greater detail below, by executing the control program 8.

The control program 8 is implemented as a system program 8. It is not therefore a user program that can be modified as required by a user (not shown in FIG. 1). In fact the control program 8 is written to a nonvolatile memory 10 (e.g. an EEPROM) by the manufacturer of the electronic control device 2. The memory 10 is incorporated in the electronic control device 2 as a storage device 9. It corresponds to a data carrier.

Figure 2:
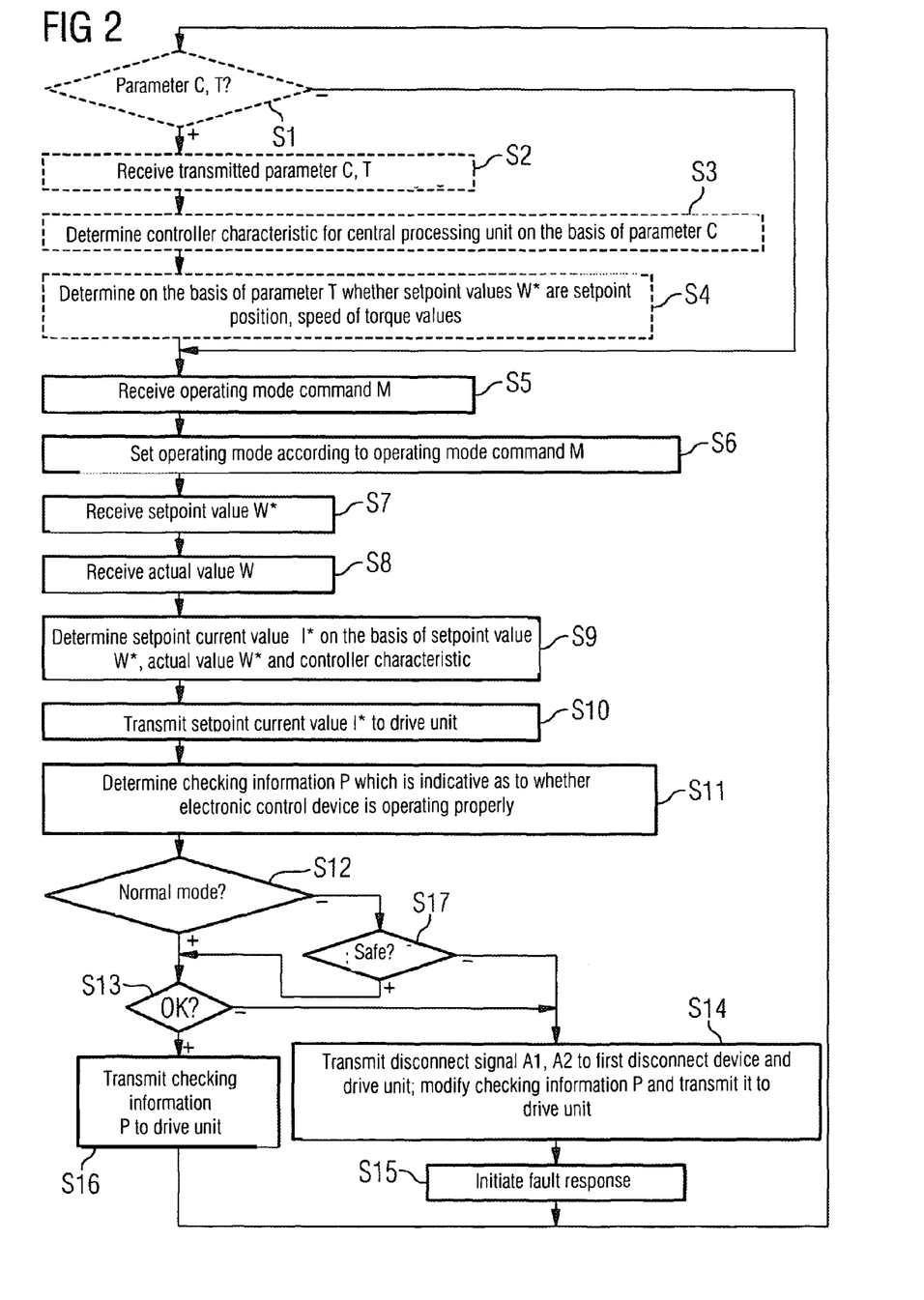
FIGS. 2 and 3 show flowcharts and
FIG. 4 shows a variant of FIG. 1.

On the basis of the programming with the control program 8, the electronic control device 2 preferably operates as follows (see FIG. 2):

In a step S1, the electronic control device 2 checks whether parameters C, T are specified for it by the higher-order control device 1 via an input interface 11. If this is the case, the electronic control device 2 proceeds to steps S2 to S4. If not, it goes directly to step S5.

In step S2, the electronic control device 2 receives the transmitted parameter C, T. In step S3, the central processing unit 7 determines a controller characteristic for the central processing unit 7 on the basis of the parameter C. For example, the parameter C can be used to select whether the central processing unit 7 operates as a P-, PI-, PID- or $PT_1$-controller, etc., to set the proportional gain of the controllers or the integration time constant of the controllers, etc. For the sake of completeness it should be mentioned that the parameter C is not necessarily a scalar parameter. In fact it can also be a vector quantity.

On the basis of the parameter T, the central processing unit 7 determines as part of step S4 whether to treat the setpoint values W* yet to be received by it as setpoint position values, as setpoint speed values or as setpoint torque values.

Although the parameters C, T can be used to influence the mode of operation of the central processing unit 7, the control program 8 is not modified. It is merely the way in which the control program 8 is executed that is set.

Steps S1 to S4 are only optional. They can be omitted if necessary. For this reason they are only represented by dashed lines in FIG. 2.

In a step S5, the central processing unit 7 receives an operating mode command M from the higher-order control device. On the basis of the operating mode command M, the central processing unit 7 decides in a step S6 whether it assumes normal mode or monitoring mode. It sets the operating mode accordingly.

In step S7, the central processing unit 7 of the electronic control device 2 receives a setpoint value W* from the higher-order control device 1 via the input interface 11. As already mentioned, the setpoint value W* is generally a setpoint position value, a setpoint speed value or a setpoint torque value.

In a step S8, the central processing unit 7 of the electronic control device 2 receives an actual value W of the electric motor 4. The actual value W corresponds to the setpoint value W*.

If the setpoint value W* is a position setpoint value, the actual value W is therefore also an actual position value, etc. The actual value W is fed to the central processing unit 7 in the usual way.

In a step S9, the central processing unit 7 determines a setpoint current value I* on the basis of the setpoint value W*, the actual value W and the controller characteristic of the central processing unit 7.

In a step S10, the central processing unit 7 transmits the setpoint current value I* to the drive unit 3 via the output interface 5.

In a step S11, the central processing unit 7 of the electronic control device 2 generates the checking information P. The checking information P, in itself or in conjunction with the at least one setpoint current value I*, is indicative as to whether the electronic control device 2 is operating properly.

The checking information P determined can essentially be of any kind, as long as on the basis of the checking information P—if necessary in conjunction with at least one setpoint current value I*—it can be detected whether the electronic control device 2 is operating properly. For example, the control program 8 can have a payload part 8' and a supplementary part 8". Both parts 8', 8" are fed the setpoint value W* and the actual value W by the central processing unit 7. The payload part 8' determines the corresponding setpoint current value I* on the basis of the setpoint value W* and the actual value W.

The supplementary part 8" has been generated automatically on the basis of the payload part 8'. When the electronic control device 2 is operating properly, the supplementary part 8" continuously provides, as checking information P, e.g. the nth multiple of the setpoint current value I*, where n is a suitably determined prime number. This way of generating checking information P is known to people skilled in the art as coded programming.

In a step S12, the central processing unit 7 of the control device 2 checks whether it is in normal mode.

If the central processing unit 7 of the control device 2 is in normal mode, it executes a step S13. In step S13, the central processing unit 7 of the electronic control device 2 checks whether it can detect an internal fault of the electronic control device 2 and/or an external fault in another unit (e.g. the electric motor 4 or the drive unit 3). If such a fault is detected, the central processing unit 7 proceeds to a step S14. In step S14, the central processing unit 7 transmits a first disconnection signal A1 to a first disconnection device 12. By means of the first disconnection device 12 it is possible to interrupt a power supply U of the electric motor 4.

As part of step S14, the central processing unit 7 of the electronic control device 2 additionally transmits a second disconnection signal A2 to the drive unit 3. The drive unit 3 is therefore also capable of disconnecting the power supply U of the electric motor 4.

Also as part of step S14, the central processing unit 7 can modify the checking information P so that the checking information P is no longer correct. It transmits the no longer correct checking information P to the drive unit 3 as part of step S14.

The central processing unit 7 then proceeds to a step S15 in which it executes a fault response. For example, the central processing unit 7 may wait for a reset signal.

If no fault was detected in step S13, the central processing unit 7 proceeds to a step S16 in which it transmits the (unmodified and therefore correct) checking information P to the drive unit 3. From step S16, the central processing unit 7 goes back to step S1 (if any) or to step S5.

If the central processing unit 7 of the control device 2 is not in normal mode, it proceeds from step S12 to a step S17. In step S17, the central processing unit 7 checks whether the electric motor 4 is in a safe state. For example, the central processing unit 7 can check whether the actual value W or a change over time of the actual value W corresponds to the safe state. The safe state is preferably determined by settings which are stored in the control device 2 in a corresponding settings memory 10'.

Depending on the result of the check in step S17, the central processing unit 7 proceeds either to step S13 or to step S14. In particular, the central processing unit 7 proceeds to step S13 if the electric motor 4 is in the safe state. Correspondingly, the central processing unit 7 proceeds to step S14 if the electric motor 4 is not in the safe state.

The second disconnection signal A2 transmitted to the drive unit 3 can be a separate signal A2 different from the checking information P. Alternatively, it can be incorporated in the checking information P.

According to FIG. 1, the first disconnection device 12 is an integral part of the drive unit 3. The central processing unit 7 therefore transmits the first disconnection signal A1 intended for the first disconnection device 12 via the drive unit 3 to the first disconnection device 12.

As indicated in FIG. 2, the central processing unit 7 receives the setpoint value W* and the actual value W in a clocked manner, i.e. it receives a sequence of setpoint values W* and actual values W.

As also indicated in FIG. 2, the central processing unit 7 outputs the setpoint current values I* in a clocked manner to the drive unit 3. Although according to FIG. 2 the two clocks coincide, this is not mandatory. They can also be different from one another. In particular, steps S9 and S10 can be linked into an internal loop which must be run through repeatedly before steps S7 and S8 are re-executed.

In accordance with FIG. 2, the checking information P is also transmitted to the drive unit 3 with each setpoint current value I*. This is also not absolutely necessary. In fact, it may be sufficient to transmit the checking information P to the drive unit 3 at greater time intervals, e.g. once every minute or once every quarter hour.

As shown in FIG. 1, the drive unit 3 likewise has a central processing unit 13. As indicated in FIG. 1, the central processing unit 13 can be incorporated in an ASIC 14, for example. Its circuitry can, as shown in FIG. 1, be designed such that it operates without executing a control program.

It is possible for the drive unit 3 to function in different operating modes, in particular in normal mode and in monitoring mode. In this case, appropriate mode switching is required. In the present case, the two operating modes are identical. They are therefore always executed together.

Figure 3:
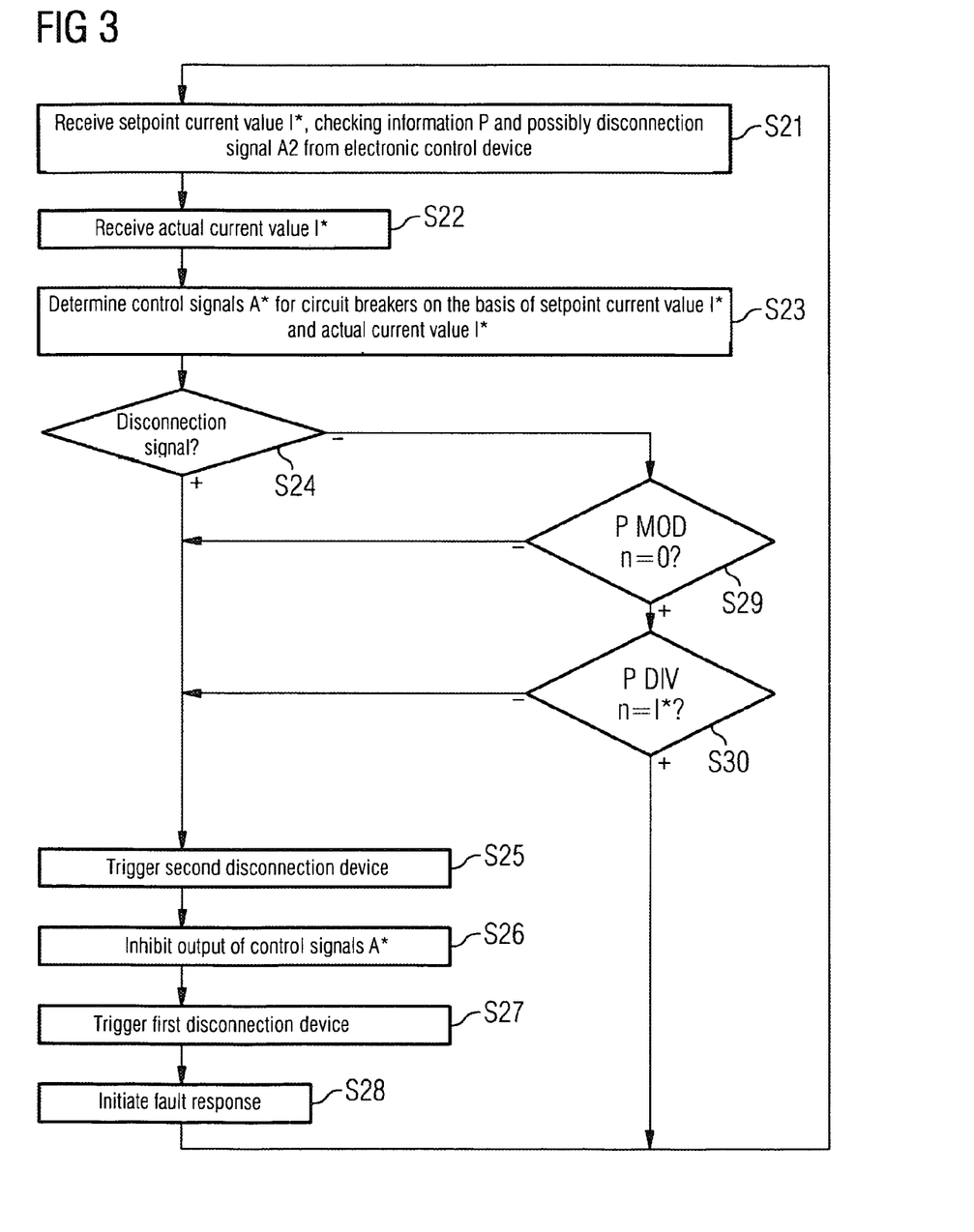

According to FIGS. 1 and 3, during operation the central processing unit 13 of the drive unit 3 receives, via the input interface 6, a setpoint current value I* from the electronic control device 2 in a step S21. Additionally as part of step S21 it also receives the checking information P. If a disconnection signal A2 for the central processing unit 13 of the drive unit 3 is transmitted by the central processing unit 7 of the control device 2, the central processing unit 13 also receives the disconnection signal A2 in step S21.

The central processing unit 13 of the drive unit 3 is also fed an actual current value I in the normal manner, which it receives in a step S22.

In a step S23, the central processing unit 13 of the drive unit 3 determines control signals A* for a number of circuit breakers 15 on the basis of the setpoint current value I* and the actual current value I. The circuit breakers 15 are in general electronic circuit breakers 15, e.g. power transistors or thyristors.

The circuit breakers 15 are generally an integral part of the drive unit 3. In this case the central processing unit 13 directly controls the circuit breakers 15 accordingly. The central processing unit 13 therefore outputs the control signals A* to the circuit breakers 15. The electric motor 4 is connected to the power supply U by means of the circuit breakers 15.

In a step S24, the central processing unit 13 of the drive unit 3 checks whether a disconnection signal A2 has been fed thereto by the central processing unit 7 of the control device 2. If the disconnection signal A2 is transmitted to the central processing unit 13 of the drive unit 3 as a separate signal A2, the presence of the disconnection signal A2 can obviously be checked for directly. If the disconnection signal A2 is contained in the checking information P, it is first extracted from the checking information P.

If the disconnection signal A2 has been transmitted to the central processing unit 13, in a step S25 the central processing unit 13 triggers a second disconnection device 16, thereby interrupting the power supply U of the electric motor 4.

Alternatively or in addition, in a step S26 the central processing unit 13 inhibits the outputting of the control signals A* to the circuit breakers 15. The power supply U of the electric motor 4 can also be disconnected in this way.

In a step S27 it is also optionally possible for the central processing unit 13 to trigger the first disconnection device 12 which is controlled directly by the central processing unit 7 of the control device 2.

In a step S28, the central processing unit 13 executes a fault response. For example, it can wait for a reset signal.

As shown in FIG. 1, the first disconnection device 12, the second disconnection device 16 and the circuit breakers 15 are connected in series. The power supply of the electric motor 4 is therefore disconnected by appropriately triggering just one of these three elements 12, 15, 16.

If the disconnection signal A2 has not been transmitted to the central processing unit 13, the central processing unit 13 of the drive unit 2 checks whether the checking information P has been transmitted and is correct. In the present case in which the checking information P has been generated by coded programming, the central processing unit 13 checks in a step S29 whether the checking information P is divisible by the abovementioned prime number n. Alternatively or additionally, the central processing unit 13 checks in a step S30 whether the checking information P is the nth multiple of the setpoint current value I*.

If the checks carried out yield a positive result, the checking information P is correct. In this case the central processing unit 13 returns to step S21. However, if one of the checks in steps S29 and S30 yields a negative result, the central processing unit 13 proceeds to step S25.

The disconnection reliability in the event of a fault can be increased still further if the central processing unit 7 of the control device 2 controls not only the first disconnection device 12 but also the second disconnection device 16 and/or inhibits outputting of the control signals A* in the event of a fault.

The disconnection devices 12, 16 are preferably electromechanical switching devices. However, it is also possible to implement them as electronic switching devices.

The first disconnection device 12 and the second disconnection device 16 are preferably integral parts of the drive unit 3. The drive unit 3 therefore receives, among other things, the disconnection signal A1 (shown by a dashed line in FIG. 1) from the electronic control device 2 for the first disconnection device 12. The disconnection signal A1 is forwarded by drive unit 3 to the first disconnection device 12, bypassing the central processing unit 13.

In the illustration shown in FIG. 1, the circuitry of the central processing unit 13 is designed such that it operates without executing a control program.

Figure 4:
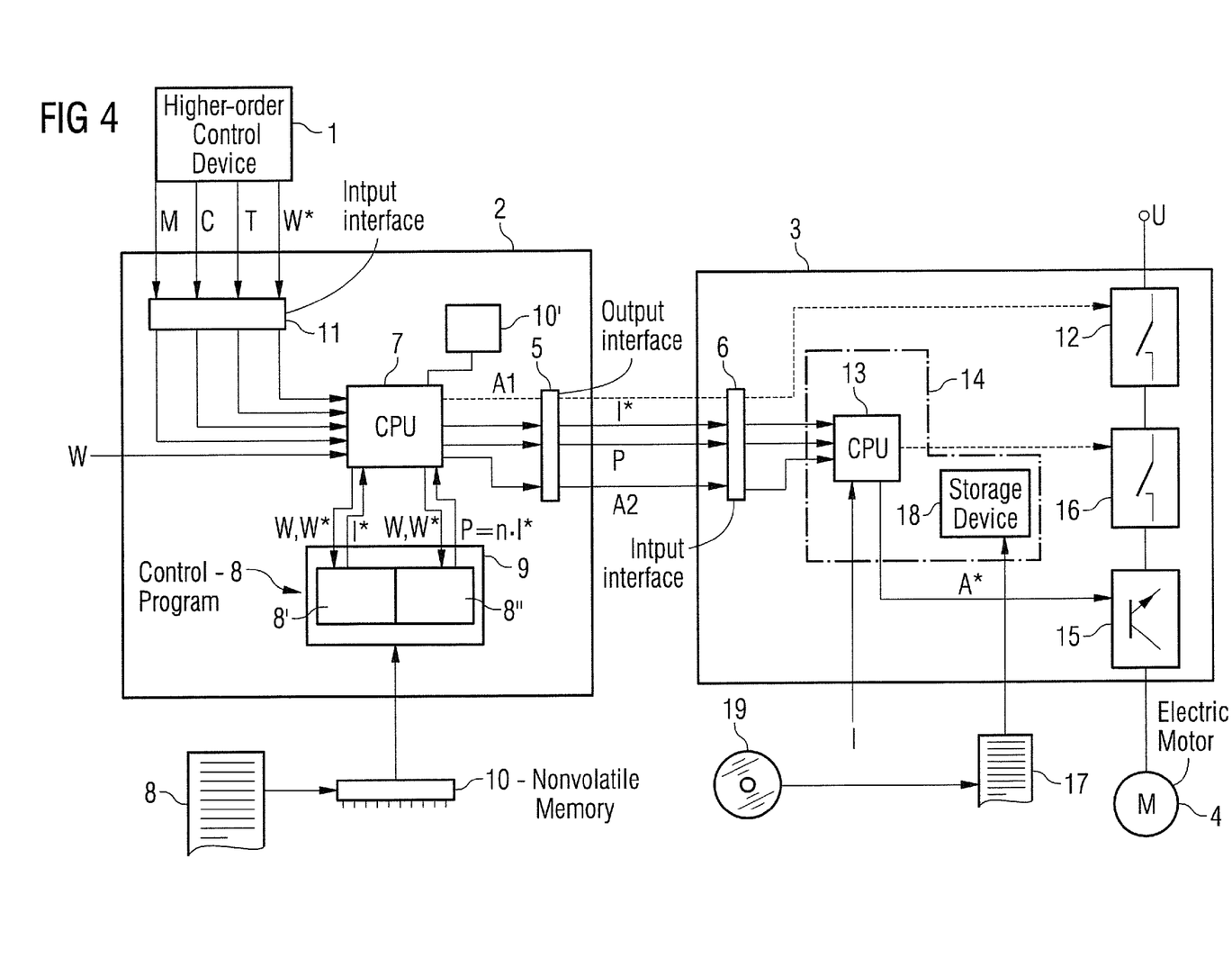

The drive unit 3 shown in FIG. 4 corresponds in terms of its function to the drive unit 3 shown in FIG. 1. However, unlike the drive unit 3 in FIG. 1, in the illustration in FIG. 4 the drive unit 3 executes a control program 17 which is stored in a storage device 18 and defines the functionality of the central processing unit 13. In the embodiment shown in FIG. 4 the central processing unit 13 performs its above described function by executing the control program 17.

The control program 17 is also a system program 17. It cannot be modified by the user, rather it is written to the storage device 18 by the manufacturer of the drive unit 3. For example, by means of a suitable programming device, the control program 17 can be read from a data carrier 19 on which the control program 17 is stored, and written to the storage device 18.

The central processing unit 13 can also—as in the embodiment according to FIG. 1—be incorporated in an ASIC 14. The storage device 18 can be disposed outside the ASIC 14. However, it can also be incorporated in the ASIC 14.

By means of the above described embodiments of the electronic control device 2 and of the electronic drive unit 3 it is thus possible to implement monitoring of the electronic control device 2 in a simple and inexpensive manner.

The above description serves merely to explain the present invention. However, the scope of protection of the present invention shall be determined solely by the accompanying claims.

The invention claimed is:

1. An electronic control device of an electrical drive system, comprising:
   a central processing unit, wherein the central processing is configured
      in normal mode to receive a sequence of setpoint position, setpoint speed or setpoint torque values from a control device that is of a higher order than the electronic control device, to determine setpoint current values on the basis of the received setpoint values and corresponding actual values and to transmit the setpoint current values to a further central processing unit of a drive unit that is of lower order than the electronic control device,
      in monitoring mode to check whether an electric motor controlled by the drive unit is in a safe state, and, in the event that the electric motor is not in the safe state, to output a first disconnection signal to a first disconnection device and to transmit a second disconnection signal to the further central processing unit of the drive unit so that a power supply of the electric motor is interrupted both by the first disconnection device and the drive unit, and
      in the monitoring mode to generate checking information, which in itself or in conjunction with at least one other signal transmitted to the further central processing unit of the electronic drive unit during monitoring mode is indicative as to whether the electronic control device is functioning correctly, and to transmit the checking information to the further central processing unit of the electronic drive unit.

2. The electronic control device as claimed in claim 1, wherein the central processing unit receives an operating mode command from the higher-order control device and decides on the basis of the operating mode command whether it assumes normal mode or monitoring mode.

3. The electronic control device as claimed in claim 1, wherein the safe state is determined by settings stored in the electronic control device.

4. The electronic control device as claimed in claim 1, wherein the central processing unit receives a setpoint parameter from the higher-order control device and decides on the basis of the setpoint parameter whether setpoint values received therefrom are setpoint position, speed or torque values.

5. The electronic control device as claimed in claim 1, wherein the second disconnection signal transmitted to the further central processing unit is contained in the checking information.

6. The electronic control device as claimed in claim 1, wherein the second disconnection signal transmitted to the further central processing unit a different signal from that of the checking information.

7. The electronic control device as claimed in claim 1, wherein the central processing unit determines the checking information on the basis of the setpoint or actual values by coded programming.

8. The electronic control device as claimed in claim 1, wherein the central processing unit generates the checking information even in the normal mode and transmits the checking information to the further central processing unit.

9. The electronic control device as claimed in claim 1, wherein the central processing unit transmits the disconnection signal intended for the first disconnection device to the drive unit.

10. The electronic control device as claimed in claim 1, further comprising:
    a storage device in which a control program is stored, wherein the central processing unit performs its functions by executing the control program.

11. The electronic control device as claimed in claim 10, wherein the control program is implemented as a system program.

12. An electronic drive unit of an electrical drive system, comprising:
    a central processing unit, wherein the central processing unit is configured
       in normal mode to receive a sequence of setpoint current values from an electronic control device of a higher order than the drive unit, to determine, on the basis of the setpoint current values, control signals for a number of circuit breakers to connect an electric motor to a power supply according to the setpoint current values, and to output said control signals to the circuit breakers,
       in monitoring mode to check whether a second disconnection signal is transmitted thereto by the control device, and, in the event of transmission of the second disconnection signal, to interrupt the power supply of the electric motor via a second disconnection device, and
       in the monitoring mode, to check whether checking information, which in itself or in conjunction with at least one other signal transmitted to the central processing unit of the drive unit in monitoring mode is indicative as to whether the electronic control device is operating properly, is transmitted thereto by the control device, and, in the event that the checking information is not being transmitted or is incorrect, likewise to interrupt the power supply of the electric motor via the second disconnection device.

13. The drive unit as claimed in claim 12, wherein the second disconnection signal transmitted to the central processing unit is contained in the checking information.

14. The drive unit as claimed in claim 12, wherein the second disconnection signal transmitted to the central processing unit is a different signal from that of the checking information.

15. The drive unit as claimed in claim 12, wherein the central processing unit checks the checking information to ascertain whether it corresponds to a predetermined number in the sense of coded programming or to the at least one other signal transmitted to the central processing unit in monitoring mode.

16. The drive unit as claimed in one of claims 12, wherein the normal mode and the monitoring mode are identical.

17. The drive unit as claimed in claim 12, wherein the drive unit receives from the electronic control device a first disconnection signal for a first disconnection device and forwards the first disconnection signal to the first disconnection device.

18. The drive unit as claimed in claim 12, wherein the drive unit forwards the disconnection signal for the first disconnection device to the first disconnection device, bypassing the central processing unit of the drive unit.

19. The drive unit as claimed in claim 12, further comprising:

a storage device in which a control program is stored, wherein the storage device is incorporated in an ASIC.

20. The drive unit as claimed in claim 12, wherein
the circuit breakers are an integral part of the drive unit,
the central processing unit of the drive unit is incorporated in the ASIC.

* * * * *